Jan. 26, 1926.
T. M. PUTNAM
PORTABLE ELECTRIC STOVE
Filed Dec. 6, 1924
1,570,778
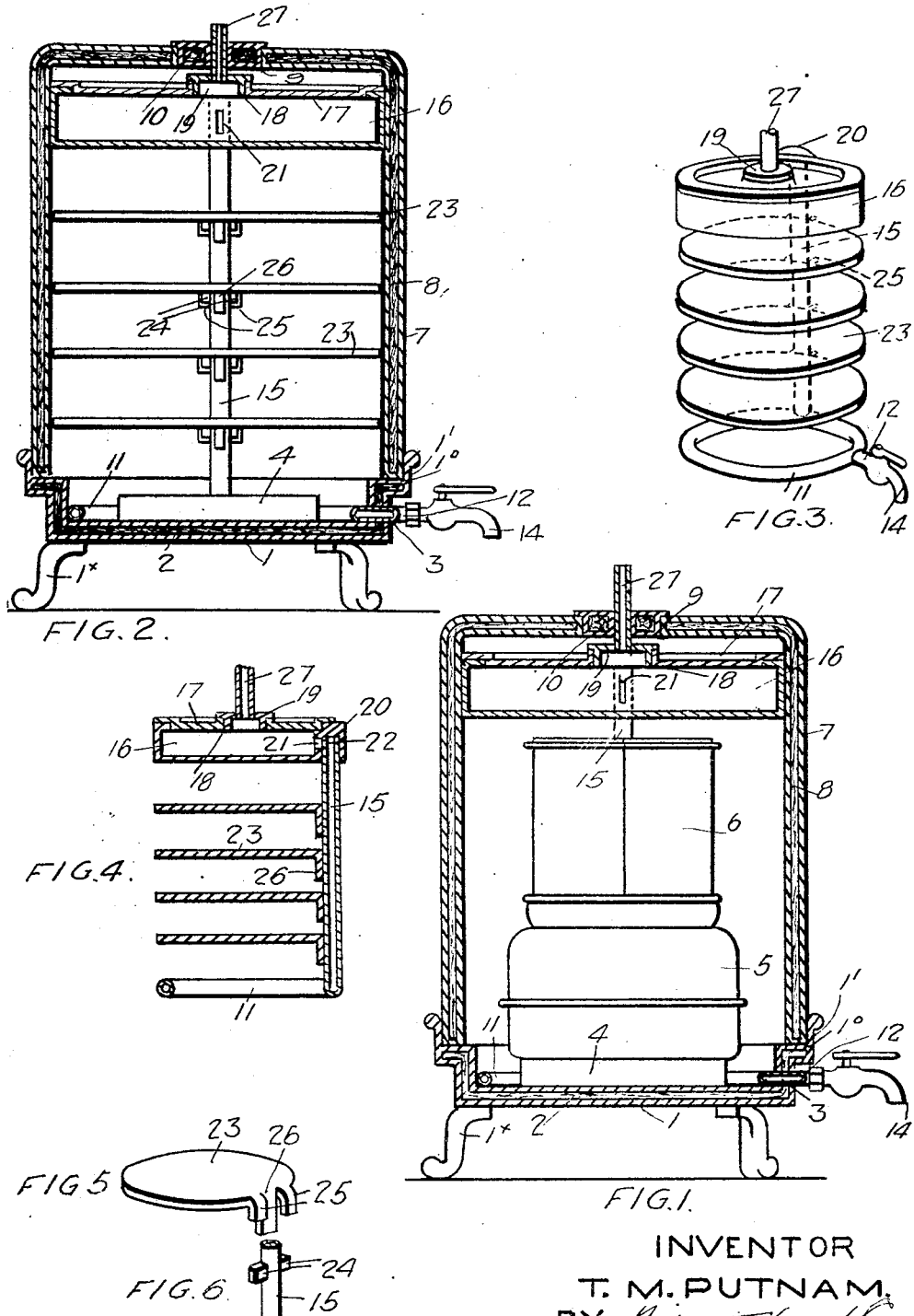
INVENTOR
T. M. PUTNAM,
BY
ATTORNEYS Patented Jan. 26, 1926.

1,570,778

UNITED STATES PATENT OFFICE.

THOMAS MERRITT PUTNAM, OF TORONTO, ONTARIO, CANADA.

PORTABLE ELECTRIC STOVE.

Application filed December 6, 1924. Serial No. 754,329.

*To all whom it may concern:*

Be it known that I, THOMAS MERRITT PUTNAM, a subject of the King of Great Britain, and a resident of the city of Toronto, in the county of York, in the Province of Ontario, Canada, have invented certain new and useful Improvements in Portable Electric Stoves, of which the following is the specification.

My invention relates to improvements in portable electric stoves, of the type provided with a dished lower member having a central heating element and a dome support upon the dished member at its lower edge, to form a cooking chamber, and the object of the invention is to devise simple means which may be contained within the cooking chamber for providing a hot water supply from which water may be readily drawn for the purpose of making tea or for any other purpose, and which will not interfere with the other cooking utensils which are usually placed within the cooking chamber, and at the same time to provide means when the ordinary cooking utensils are removed, for supporting a series of shelves whereby the cooking chamber may be converted into an oven for the baking of pies or any other victuals desired, and it consists essentially of the arrangement and construction of parts hereinafter more particularly described by the following specification.

Fig. 1 is a sectional view through my electric heater showing the cooking utensils placed therein.

Fig. 2 is a similar view to Fig. 1 showing my stove adapted for baking.

Fig. 3 is a perspective detail on a reduced scale of my water heating device and stand and the detachable shelves carried by the stand which are utilized for the purpose of baking.

Fig. 4 is a sectional view through Fig. 3.

Figs. 5 and 6 are perspective details of one of the baking shelves and a portion of the supporting standard thereof separated apart.

In the drawings like characters of reference indicate corresponding parts in each figure.

1 is the base member of an electric stove carried by supporting legs 1× and which is of dished form provided at the upper edge of the dish with a horizontal flange 1° surrounded by an annular flange 1¹. The base member 1 is preferably formed with a double wall between which is interposed suitable non-conducting material such as asbestos, as indicated at 2.

3 is an orifice formed in the side wall of the dished member 1, for a purpose which will hereinafter appear.

4 is the heating element of the stove which is of ordinary construction and is therefore not described in detail.

5 is a roasting receptacle and 6 are cooking receptacles for vegetables, which are supported one above the other in the usual manner common to this type of stove.

7 is a dome which is also formed with a double wall having interposed therebetween insulating medium such as asbestos 8. The upper end of the dome is flat, as indicated, and provided with a central orifice 9 which is closed by cover 10 which is also preferably insulated.

11 is an annular pipe which rests on the bottom of the dished member 1 around the heating element 4. The annular pipe 11 is provided with a radial branch 12 which extends through the orifice 3 and which is provided with a tap 14 from which water may be drawn, as hereafter described.

15 is a vertical pipe forming a standard, the lower end of the pipe 15 being formed integral with the annular pipe 11 and in communication one with the other.

16 is a water heating chamber or boiler which is preferably circular in form and provided with a removable cover 17 provided centrally with a filling orifice 18, and a closing cap 19.

Such filling orifice, it will be readily seen on referring to Figs. 1 and 2, will be directly beneath the central orifice 9 of the dome 7. It will thus be seen that when it is desired to fill the water chamber 16, all that it is necessary to do is to remove the caps 10 and 19 and pour the water directly into the water chamber 16. The water chamber 16 is provided with a peripheral boss 20 into which the upper end of the pipe 15 extends, the boss 20 being provided with a water port 21 and the pipe 15 with a similar port 22. By this means the water contained in the water chamber 16 passes down the pipe 15 into the annular pipe 11 and may be drawn therefrom through the tap 14 whenever desired. If desired, the cap 10 may be removed and after the tea is made, the teapot may be placed upon the top of the dome over the orifice 9 so as to keep it hot.

When it is desired to use my oven for baking, the utensils 5 and 6 are removed, and the construction which I will now describe is employed.

23 are a series of circular shelves which are detachably secured to the pipe 15 at suitably spaced distances apart, so as to form a support for pies or other commodities which it is desired to cook. I prefer to detachably connect the shelves to the standard pipe 15 by means of lugs 24 which extend from each side of the pipe 15, and by providing each shelf 23 with hook lugs 25 which engage the lugs 24, and with a depending lug 26 which engages the front face of the standard pipe 15 when the lugs are in engagement, so as to support the shelf 23 in a horizontal position.

27 is a vent tube which extends upward from the water chamber 16, preferably in the centre thereof, and through the centre of the cap 10. By this means, any great pressure of steam produced in the water chamber is carried off through the vent tube to the atmosphere, preventing any danger of the steam leaking into the cooking chamber and spoiling the contents, which would be extremely detrimental especially when the operation of baking is taking place.

I preferably place the vent tube in the centre, and the water chamber may be made practically the same size as the interior of the dome 7, so that in placing the dome in position the water chamber will act as a guide, guiding the vent tube through the orifice 27 through which it passes.

All that it is necessary to do when it is desired to cook in the ordinary way, is to lift the shelves 23 out of engagement with the standard 15 and thereby form a clear space into which the cooking utensils 5 and 6 may be placed in the ordinary manner.

From this description it will be seen that I have devised a very simple device which in an electric stove of the portable type disclosed will provide an adequate supply of hot water easily obtainable at all times for the purpose of making tea or for any other purpose desired, which may be easily filled or cleaned whenever desired, by which the tea when made may be kept hot, and in which simple means is provided for providing facilities for baking which may be readily placed in position or removed whenever desired without materially altering the construction of the stove as originally constructed.

What I claim as my invention is:

1. In a portable stove, the combination with the base member, a heat source located centrally thereof, and a dome cover, of an annular tubular water containing member concentric with the centre of the heat source, a pipe extending outward therefrom to a point exterior of the stove, a tap for controlling the flow of water therefrom, and a vent pipe extending upward from the tubular water container through the top of the dome to the atmosphere.

2. In a portable electric stove, the combination with the dished base member, and an electric element carried centrally in the dished base member and a dome supported by the base member to form a cooking chamber, of a water heating chamber located in the upper portion of the cooking chamber, a supporting stand comprising a vertical standard member depending from the water chamber adjacent its exterior periphery, an annual base member to which the lower end of the standard is connected, adapted to fit within the dished member of the heater, and means for conducting the water from the interior of the water heating chamber through the base of the heater and a controlling tap for such means.

3. In a portable electric stove, the combination with a dished base member, and an electric element carried centrally in the dished base member and a dome supported by the base member to form a cooking chamber, of a water heating chamber located in the upper portion of the cooking chamber, a supporting stand comprising a tubular standard member communicating with the interior of the water heating chamber at its upper end, a circular base member with which the lower end of the standard communicates, provided with a tubular branch extending outward through the base, and a tap for such branch.

4. In a portable electric stove, the combination with a dished base member and an electric element carried centrally in the dished base member and a dome supported by the base member to form a cooking chamber, of a water heating chamber located in the upper portion of the cooking chamber, a supporting stand comprising a vertical standard member depending from the water chamber adjacent its exterior periphery, an annular base member to which the lower end of the standard is connected adapted to fit within the dished member of the heater, means for conducting the water from the interior of the water heating chamber through the base of the heater, a controlling tap for such means, and a series of shelves, and detachably connected means between the shelves and the standard.

5. In a portable electric stove, the combination with a dished base member, a heating element located in the dished base member, and a dome supported upon the dished base member to form a cooking chamber, of a water heating chamber located in the upper portion of the cooking chamber, a supporting frame for the chamber, means for conducting water from the chamber through the base of the heater, a controlling tap for such conducting means, and a series of shelves detachably supported within the water chamber supporting frame.

6. A water heating device adapted for insertion in the cooking chamber of a portable electric stove and comprising a circular stand, a supporting standard extending upward from the stand, and a water chamber carried by the standard so as to form a clear cooking space between such water chamber and the stand, and means for drawing off water from the water chamber operable from the exterior of the stove.

7. A water heating device adapted for insertion in the cooking chamber of a portable electric stove and comprising a circular stand, a supporting standard extending upward from the stand, a water chamber carried by the standard so as to form a clear cooking space between such water chamber and the stand, means for drawing off water from the water chamber operable from the exterior of the stove, a series of shelves, and detachable connecting means between the standard and the shelves.

8. A water heating device adapted for insertion in the cooking chamber of a portable electric stove, comprising a circular tubular stand adapted to surround the heating element of the stove, means extending to the exterior of the stove for drawing off water from the tubular stand, a water chamber, a tubular standard extending between the circular stand and water chamber, and communicating therebetween.

9. In a portable stove, the combination with the base member, a heat source located centrally thereof, a dome cover, of an annular tubular water containing member concentric with the centre of the heat source, a pipe extending outward therefrom to a point exterior of the stove, a tap for controlling the flow of water therefrom, and a steam vent leading from the top of the water container to the exterior of the heater to the atmosphere.

THOMAS MERRITT PUTNAM.